(12) United States Patent
Beck et al.

(10) Patent No.: US 10,192,648 B2
(45) Date of Patent: Jan. 29, 2019

(54) TANK CLOSURE CESIUM REMOVAL

(71) Applicant: WESTINGHOUSE ELECTRIC COMPANY LLC, Cranberry Township, PA (US)

(72) Inventors: Mark A. Beck, Richland, WA (US); Thomas J. Gammon, Richland, WA (US); Gregory B. Harting, Hermiston, OR (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 232 days.

(21) Appl. No.: 15/270,312

(22) Filed: Sep. 20, 2016

(65) Prior Publication Data
US 2018/0033508 A1  Feb. 1, 2018

Related U.S. Application Data

(60) Provisional application No. 62/368,543, filed on Jul. 29, 2016.

(51) Int. Cl.
*C02F 1/42* (2006.01)
*G21F 9/12* (2006.01)
(Continued)

(52) U.S. Cl.
CPC .............. *G21F 9/12* (2013.01); *B01D 15/22* (2013.01); *B01D 15/361* (2013.01);
(Continued)

(58) Field of Classification Search
CPC ..... G21F 5/05; G21F 5/10; G21F 5/12; G21F 5/14; G21F 9/12; G21F 5/005; G21F 3/00;
(Continued)

(56) References Cited

U.S. PATENT DOCUMENTS 8,986,424 B2  3/2015  Nebeker
2012/0088949 A1  4/2012  Hussey et al.
(Continued)

FOREIGN PATENT DOCUMENTS

JP  2015215186 A  12/2015
WO  2013191781 A2  12/2013

OTHER PUBLICATIONS

Brown et al, Performance Evaluation of 24 Ion Exchange Materials for Removing Cesium and Strontium from Actual and Simulated N-Reactor Storage Basin Water, Sep. 1997, U.S. Department of Energy, pp. 1-61. (Year: 1997).*

(Continued)

*Primary Examiner* — Matthew O Savage
(74) *Attorney, Agent, or Firm* — Richard J. Coldren; Westinghouse Electric Company LLC

(57) ABSTRACT

The invention relates to systems, apparatus and methods for the removal of cesium and other radionuclides from liquid waste contained in a high level waste tank. The invention includes transporting a stream of the liquid waste from the high level waste tank to one or more ion-exchange column assemblies to remove the cesium therefrom using a sorbent, such as, crystalline silico-titanate. The ion-exchange column assemblies include an ion-exchange column and an integrated shield. The column is concentrically positioned within the shield and an air gap is present between the column and the shield to provide passive cooling.

7 Claims, 3 Drawing Sheets

(51) Int. Cl.
    *G21F 3/00*         (2006.01)
    *B01D 15/36*       (2006.01)
    *B01D 15/22*       (2006.01)
    *B01J 47/022*      (2017.01)
    *B01J 47/024*      (2017.01)
    *C02F 101/00*      (2006.01)
    *C02F 103/34*      (2006.01)
    *G21F 5/10*        (2006.01)
    *G21F 5/005*       (2006.01)
    *G21F 5/14*        (2006.01)
    *G21F 5/12*        (2006.01)

(52) U.S. Cl.
    CPC ........... *B01J 47/022* (2013.01); *B01J 47/024* (2013.01); *C02F 1/42* (2013.01); *G21F 3/00* (2013.01); *C02F 2101/006* (2013.01); *C02F 2103/34* (2013.01); *C02F 2201/002* (2013.01); *C02F 2201/006* (2013.01); *C02F 2201/007* (2013.01); *C02F 2201/008* (2013.01); *G21F 5/005* (2013.01); *G21F 5/10* (2013.01); *G21F 5/12* (2013.01); *G21F 5/14* (2013.01); *G21Y 2002/60* (2013.01); *G21Y 2004/601* (2013.01)

(58) Field of Classification Search
    CPC .. C02F 1/42; C02F 2101/006; C02F 2103/34; C02F 2201/002; C02F 2201/006; C02F 2201/007; C02F 2201/008; B01J 47/022; B01J 47/024; B01D 15/22; B01D 15/361; G21Y 2002/60; G21Y 2004/601
    See application file for complete search history.

(56) References Cited

U.S. PATENT DOCUMENTS

| | | | |
|---|---|---|---|
| 2013/0161260 A1* | 6/2013 | Ferguson | G21F 9/06 210/682 |
| 2014/0263073 A1 | 9/2014 | Barker et al. | |
| 2015/0368136 A1* | 12/2015 | Raymont | C02F 1/008 210/662 |
| 2017/0047135 A1* | 2/2017 | Smith | G21F 9/12 |
| 2017/0050865 A1* | 2/2017 | Denton | C02F 1/42 |

OTHER PUBLICATIONS

PCT/US2016/052583—International Search Report and Written Opinion, 10 Pages.

* cited by examiner

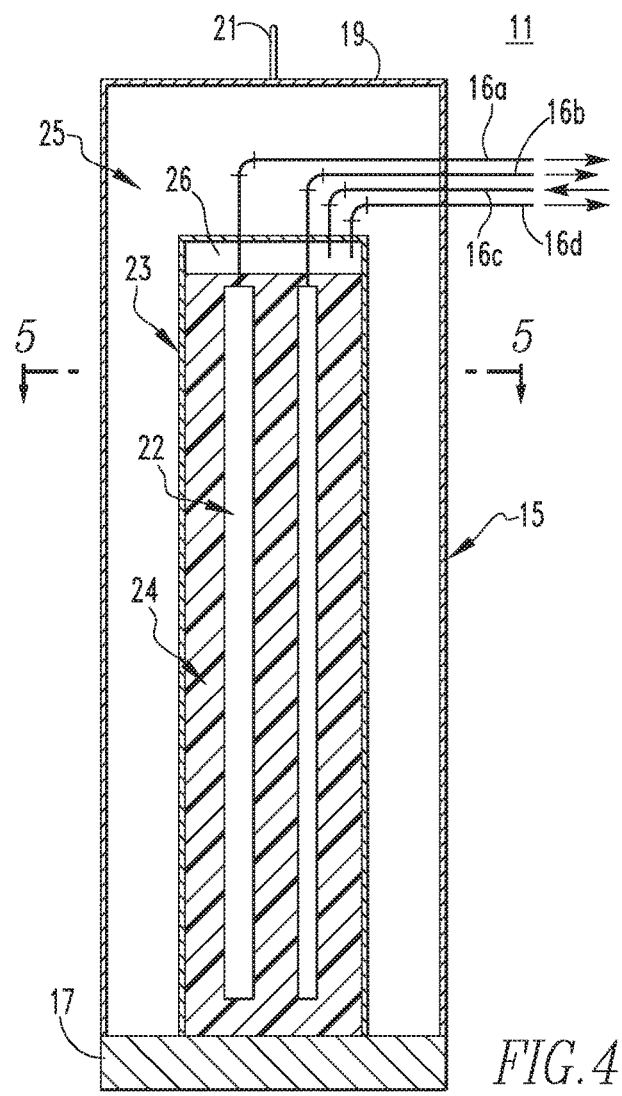
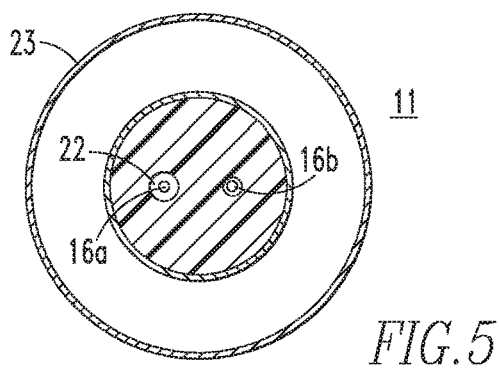
FIG.4
FIG.5

TANK CLOSURE CESIUM REMOVAL

CROSS-REFERENCE TO RELATED APPLICATIONS

This application claims priority under 35 U.S.C. § 119(e) from U.S. provisional patent application No. 62/368,543, entitled "TANK CLOSURE CESIUM REMOVAL" and filed on Jul. 29, 2016, the contents of which are incorporated herein by reference.

FIELD OF THE INVENTION

This invention generally relates to systems and methods for tank waste remediation and, more particularly, apparatus, such as, ion-exchange columns, for use in selectively removing cesium and other radionuclides from liquid, radioactive and/or chemically hazardous waste that is stored in tanks at contaminated sites and facilities.

BACKGROUND

There is a legacy of radioactive and chemically hazardous wastes at contaminated sites and facilities throughout the United States. Further, there is an initiative to establish and conduct an integrated program for the development, testing, evaluation and deployment of remediation technology to characterize, retrieve, treat, concentrate and dispose of radioactive waste stored in underground high-level waste tanks at these various contaminated sites and facilities. A large portion of the tank waste exists as a liquid solution (supernate) that contains soluble radionuclides, along with high concentrations of sodium and potassium salts. In general, the fission product radionuclides constitute less than 0.1% of the waste by mass and cesium is the primary source of radiation, especially highly penetrating gamma radiation. As a result, the majority of the liquid can be disposed of as low-level waste (LLW) at a much lower cost if the radioactivity can be reduced below the regulatory limits.

Thus, there is a need in the art to design and develop efficient and effective chemical processes and equipment for removing cesium and other radionuclides from bulk liquid LLW supernate, and concentrate it into a small high-level waste (HLW) fraction, to protect people and the environment from the hazards of the waste. More particularly, there is a desire to design and develop an ion-exchange column that includes integral shielding, cartridge configuration, inherent cooling and, the ability to be used and subsequently undergo interim safe storage in the absence of active safety systems.

SUMMARY OF THE INVENTION

In one aspect, the invention provides an ion-exchange column assembly for removal of cesium from a stream of liquid waste including an integral shield, which includes a shield base having a perimeter, a shield cap having a perimeter and positioned opposite the shield base, and a shield wall extending longitudinally between the shield base and the shield cap, and extending along the perimeter of each of the shield cap and the shield base; a shield cavity formed by the integral shield; a pressure vessel concentrically positioned within the shield cavity; an ion-exchange resin located in the pressure vessel; and an air gap formed by an annular space between an outer surface of the pressure vessel and an inner surface of the integral shield.

In certain embodiments, resin is crystalline silico-titanate.

Also, the ion-exchange column assembly can include at least one lug coupled to the shield cap for use in lifting the ion-exchange column assembly.

In another aspect, the invention provides a cesium removal system to remove cesium from a waste tank. The cesium removal system includes conduit, e.g., piping, hoses or a combination thereof, having a proximate end connected to the waste tank; a liquid waste stream that flows from the waste tank through the conduit; one or more pre-filters located downstream of the waste tank to receive the liquid waste stream and to discharge a filtered liquid waste stream; an enclosure; a skid located in the enclosure; and one or more ion-exchange column assemblies positioned on the skid and located downstream of the one or more pre-filters, to receive the filtered liquid waste stream, separate cesium therefrom, and to discharge a clean liquid stream. The one or more ion-exchange column assemblies include a shield base having a perimeter, a shield cap having a perimeter and positioned opposite the shield base, and a shield wall extending longitudinally between the shield base and the shield cap, and extending along the perimeter of each of the shield cap and the shield base; a shield cavity formed by the integral shield; a pressure vessel concentrically positioned within the shield cavity; an ion-exchange resin located in the pressure vessel; and an air gap formed by an annular space between an outer surface of the pressure vessel and an inner surface of the integral shield.

In certain embodiments, the system includes two pre-filters and four ion-exchange column assemblies.

In still another embodiment, the invention provides a method of removing cesium from liquid waste contained in a waste tank. The method includes transporting the liquid waste stream through conduit, e.g., piping, hoses or a combination thereof, to one or more pre-filters to produce a filtered liquid waste stream; introducing the filtered liquid waste stream into one or more ion-exchange column assemblies. The one or more ion-exchange column assemblies include a shield base having a perimeter, a shield cap having a perimeter and positioned opposite the shield base, and a shield wall extending longitudinally between the shield base and the shield cap, and extending along the perimeter of each of the shield cap and the shield base; a shield cavity formed by the integral shield; a pressure vessel concentrically positioned within the shield cavity; an ion-exchange resin located in the pressure vessel; and an air gap formed by an annular space between an outer surface of the pressure vessel and an inner surface of the integral shield. The method further includes passing said filtered liquid waste stream through the one or more ion-exchange column assemblies; separating cesium from the filtered liquid waste stream to produce a clean liquid stream.

BRIEF DESCRIPTION OF THE DRAWINGS

FIG. 4 is a schematic showing another cut-away view of a pressure vessel in the ion-exchange column assembly as shown in FIG. 2, in accordance with certain embodiments of the invention; and FIG. 5 is a schematic showing a top view of the pressure vessel in the ion-exchange column assembly as shown in FIG. 2, in accordance with certain embodiments of the invention.

DETAILED DESCRIPTION OF PREFERRED EMBODIMENTS

Figure 1:
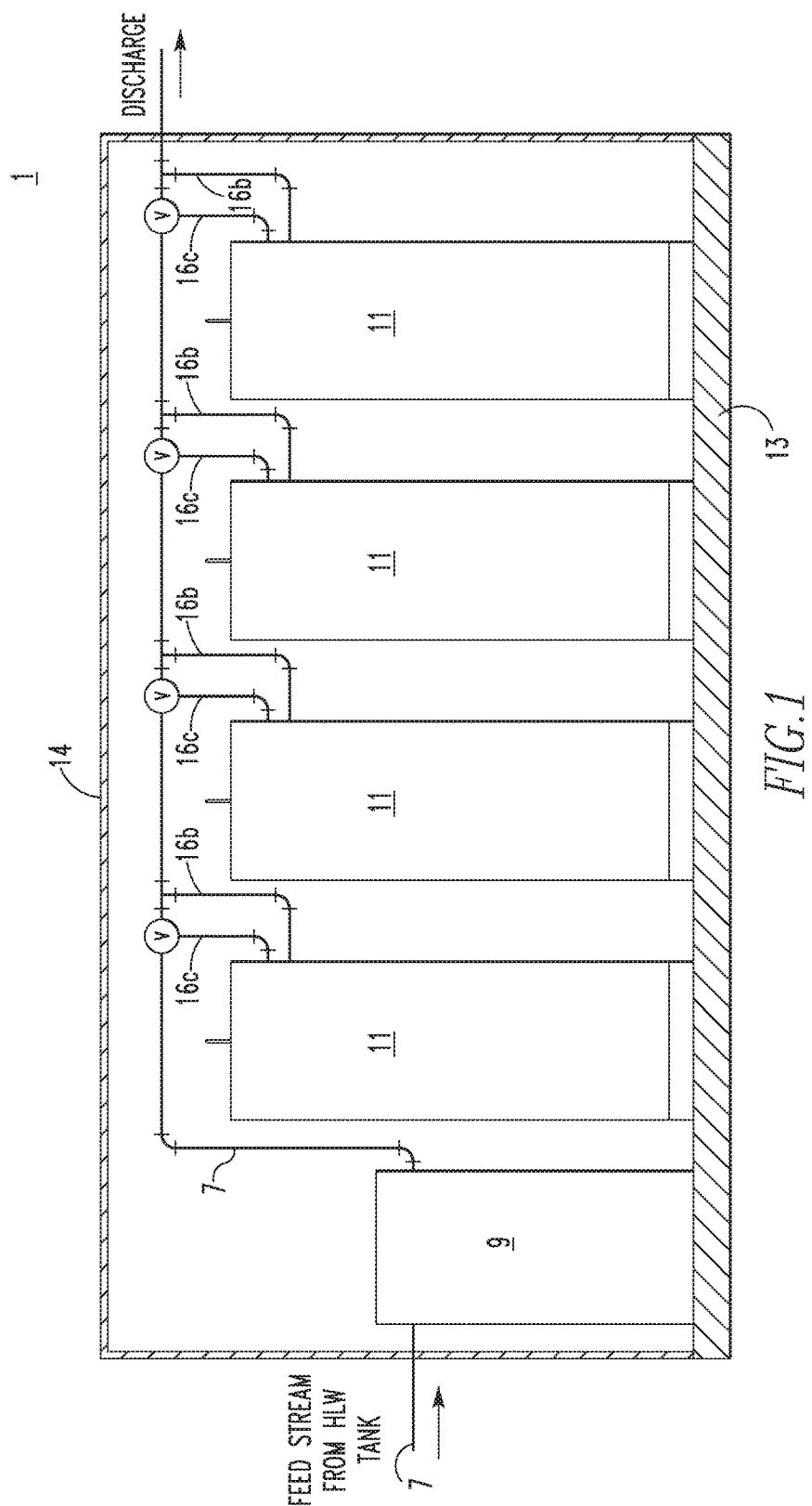
FIG. 1 is a schematic of a cesium removal system, in accordance with certain embodiments of the invention.

The invention relates to systems, apparatus and methods for tank waste remediation and, the selective removal of cesium and other radionuclides from liquid, radioactive and/or chemically hazardous waste stored in tanks, e.g., underground waste tanks, such as, high-level waste (HLW) tanks, at contaminated sites and facilities. As a result of the cesium removal, there is produced a waste, e.g., HLW, concentrate in solid form.

The size and volume of the HLW tanks can vary. Typically, a HLW tank is constructed of carbon steel and positioned inside a buried concrete vault with an annular space surrounding the tank.

In accordance with the invention, a modular cesium removal system is provided. This system generally includes process equipment housed in an enclosure and positioned on modular equipment skids. The enclosure is typically a mobile or temporary structure, such that the enclosure can be transported between locations and sites. In certain embodiments, the enclosure is a modified sea-land container. The system provides operation simplicity by utilizing one or more ion-exchange columns. Each of the columns has fully integrated shielding. The columns and shielding form a single unit, such that a column (with its shielding) can be loaded, removed from use and then placed into an interim safe storage location as a single unit, until final disposition of the waste, e.g., HLW. Further, the ion-exchange column is capable of being used as the final disposition container of the resin and therefore, eliminates the need to handle the very high dose resin by sluicing to another container. The elimination of sluicing, reduces the potential for leaks that can pose high level risks both to the worker and the environment. However, the ion-exchange column also includes piping that allows for sluicing, if sluicing is desired while the column is located in the interim safe storage location.

Prior art designs of ion-exchange columns include separate or non-integral shielding. Further, in contrast to prior art column designs and in accordance with the invention, all connections are located outside of the shielding with no access to the column itself, which is contained in the shielding. In certain embodiments, the columns are shielded to meet a required dose rate of less than 5 mR/hr at 30 cm during operation and at the interim safe storage location.

A "cartridge" approach combined with a high cesium selectivity resin provides for optimal resin utilization on multiple, shielded ion-exchange column assemblies. Various resins are known in the art for use in ion-exchange columns and for use in cesium removal. In general, the resin selected for use in the invention has the following properties: (i) stable at high pH values, (ii) compatible with vitrification processes, (iii) allows for operational latitude, multiple flow rates and feed concentrations, and (iv) does not require an active cooling system. The amount of resin can vary widely and may be dependent on the volume of liquid waste transferred from a storage tank for processing. In certain embodiments, the sorbent used for selective removal of cesium and other radionuclides is crystalline silico-titanate (CST).

The cesium removal system can be effective to remove solids and radioactive Cs-137 from aqueous high-level waste or dissolved salt solution. In certain embodiments, the design life is sufficient to process approximately 438,500 gallons of salt solution feed through the cesium removal system and, in other embodiments, as much as 625,000 gallons. Further, the system may have a decontamination factor of 1000.

In general, an underground HLW tank is connected to the cesium removal system by conduit, e.g., piping, hoses or a combination thereof, that extends between the waste tank and the cesium removal system. The conduit transports liquid waste from the waste tank and provides a feed stream to the cesium removal system. Typically, one or more pre-filters are positioned upstream of the one or more ion-exchange columns. The pre-filter provides for removal of a solid high-level waste fraction from the liquid waste feed stream, protects the ion-exchange columns from fouling with insoluble particulate, and prevents the uptake of unwanted nuclides. The pre-filter can be locally shielded to maintain radiation as low as reasonably achievable (ALARA). Two, single-stage filter assemblies can be utilized in parallel to maintain flow to the ion-exchange columns, whereby the filters are configured in a dual train configuration with control valves so that the feed can be diverted from a dirty filter to a clean filter at a set pressure differential. The dirty filter is then backwashed to the storage tank and readied for a subsequent filter backwash cycle, while a clean filter is on-line to prevent operational stoppages. The feed stream from the storage tank is operated in a loop with a control valve on the return line to control the flow rate through the filter assembly. A control system can be employed to monitor for pressure differentials across the filters and when needed, automatically divert feed flow from one filter assembly to the other, and start a backwash cycle.

After the feed stream flows through the one or more pre-filters, the flow is directed to the ion-exchange columns for removal of Cs-137. This description refers to the use of four ion-exchange columns in series in the flow stream. Any four of the columns can be valved in series and flow through the four columns can be manipulated in any order. In certain embodiments, the four ion-exchange columns are positioned in series with a valve manifold that enables process control to ensure optimal column loading while guarding against breakthrough.

There may be an initial flow through a first column A until the solution decontamination factor (DF) is less than 1000. The second column B is then placed in series and as it exceeds the solution DF, column C is placed in series with columns A and B. As column C effluent exceeds the solution DF, column D is placed in series with columns A, B and C. As the columns become loaded, the columns upstream will be bypassed, with the remaining columns on-line in series. After the flow stream is processed through the columns, the effluent is sent to another HLW tank.

If all of the installed columns become loaded, or exceed the solution DF, they may be isolated and removed. Fresh columns may be installed in place of the loaded columns. It is not expected that replacement will be necessary, but the system is capable of such replacement with minimal radiation dose exposure to personnel.

The ion-exchange columns are remotely operated and shielded for ALARA with all valves and instrumentation having remote readout operation. Further, remote radiation monitoring can be provided to monitor the radiation dose in the columns. The remote radiation monitoring also may be used to ensure that the DF is greater than 1000 by comparing the activity on the supply conduit, e.g., piping and/or hoses, from the storage tank to the discharge conduit, e.g., piping and/or hoses, and the second storage tank.

The cesium removal system and all subsystems, including but not limited to filters, columns and piping, is seismically qualified.

It is contemplated and understood that the invention can encompass more or less than four ion-exchange columns. Further, the dimensions and volume of the ion-exchange columns can vary. In certain embodiments, a column has an aspect ratio (i.e., height:width or height:diameter) of five or greater, which may depend on the shielding requirements. A maximum aspect ratio is typically established because a higher aspect ratio allows additional residence time and increased theoretical plates for enhancing DF. The columns may be fabricated of a variety of materials, such as, but not limited to, stainless steel (e.g., 316L stainless steel), and rated for about 150 psig. In certain embodiments, the ion-exchange columns are supplied with screens, e.g., Johnson screens, to prevent egress of sorbent beads from the columns. All connections associated with the ion-exchange columns can be provided from the top and all valves are positioned outside the shielding, and remotely operated. The resin capacity of the ion-exchange columns can vary and in certain embodiments, the resin capacity is about 17.6 ft$^3$.

FIG. 1 is a schematic that shows a cesium removal system 1, in accordance with certain embodiments of the invention. As shown in FIG. 1, a pipeline 7 is connected to a pre-filter 9. It is contemplated and understood that the pipeline 7 may encompass a wide variety of conduits, such as, but not limited to, pipes, hoses and combinations thereof. The pipeline 7 transports a liquid waste feed stream from a HLW tank (not shown) that is positioned on-site, for example, in an underground vault, to the pre-filter 9. In certain embodiments, the waste tank is located on a site that is owned by a customer and the cesium removal system 1 is transported to the customer site to provide services for the removal of cesium from the waste tank. The feed stream enters the pre-filter 9 and a filtered feed stream exits the pre-filter 9, and then enters the ion-exchange columns 11. FIG. 1 includes four ion-exchange columns 11 positioned downstream of the pre-filter 9. The pipeline 7 that transports the filtered feed stream to the ion-exchange columns 11 includes a plurality of valves V that are operable to permit or block flow of the filtered feed stream into one or more of the ion-exchange columns 11. The valves V can be selected from a variety of known valves, such as, but not limited to ball valves. Each of the ion-exchange columns 11 includes an inlet line 16c and an outlet line 16b. The pre-filter 9 and the four ion-exchange columns 11 are positioned on an equipment skid 13, which is located in an enclosure 14. The enclosure 14 can be a mobile container. A discharge stream exits the ion-exchange columns 11 and flows into a HLW tank (not shown).

As shown in FIG. 1, the cesium removal system 1 includes one pre-filter 9 and four ion-exchange columns 11. However, it is contemplated and understood that more than one pre-filter 9 and, more or less than four ion-exchange columns 11 may be used.

Figure 2:
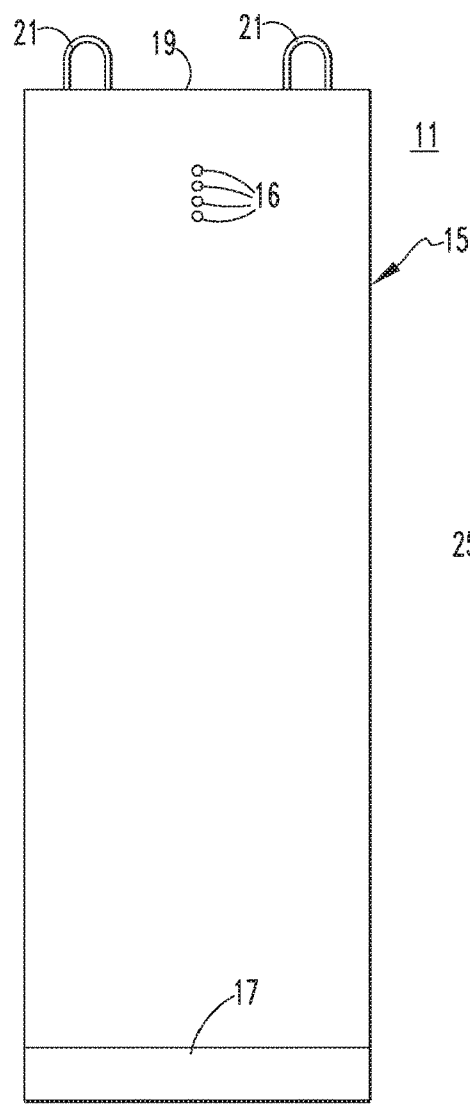
FIG. 2 is a schematic showing a detailed view of an ion-exchange column assembly as shown in FIG. 1, in accordance with certain embodiments of the invention.

FIG. 2 is a schematic that shows a detailed external view of one of the ion-exchange columns 11 as shown in FIG. 1. FIG. 2 includes a shield wall 15, which forms an exterior surface of the ion-exchange column and extends longitudinally between a shield base 17 and a shield cap 19. The shield base 17 forms the bottom end of the column and the shield cap 19 forms the opposite, top end of the column. The shield wall 15 is aligned so as to extend along the perimeters of the shield base 17 and the shield cap 19. As shown in FIGS. 1 and 2, the shape of the ion-exchange columns 11 are rectangular. However, it is contemplated and understood that the shape of the columns 11 can vary. In certain embodiments, each of the columns 11 is in the shape of a cylinder. Also shown in FIG. 2 are two lifting lugs 21, positioned on the shield cap 19, and column piping 16. The lifting lugs 21 aid in removing from operation the ion-exchange column, and transporting it from the skid 13 and enclosure 14 to an interim safe storage location (not shown) for final disposition. The lifting lugs 21 can be positioned central to a center point of the ion-exchange column to allow a crane to lift and carry each of the ion-exchange columns 11 with the shield wall 15 as a single unit. FIG. 2 also shows column piping 16. As later discussed herein, various piping (i.e., an inlet line, a sluice header, an outlet line and a vent) extend through the shield wall 15. The piping 16 and any corresponding penetrations formed in the shield wall 15 are arranged and formed, such as to prevent the egress of radiation.

Figure 3:
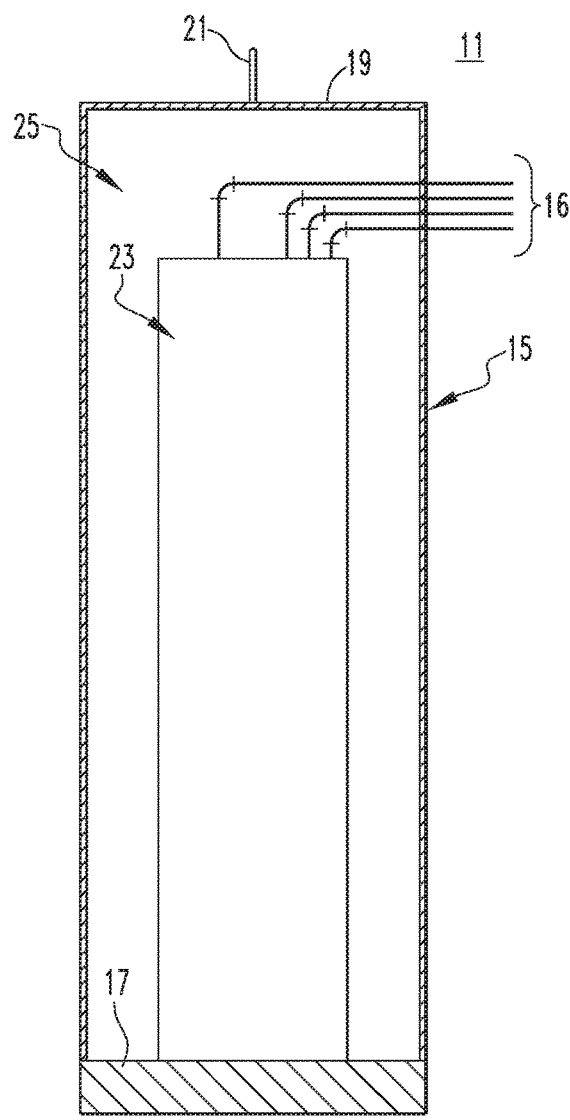
FIG. 3 is a schematic showing a cut-away view of the ion-exchange column assembly as shown in FIG. 2, in accordance with certain embodiments of the invention.

FIG. 3 is a schematic that shows a cut-away view of one of the ion-exchange columns 11, including the shield wall 15, the column piping 16, the shield base 17 and the shield cap 19 as shown in FIG. 2. In addition, FIG. 3 shows an interior space formed by the shield wall 15. A pressure vessel 23 is centrally, e.g., concentrically, located within the shield wall 15, and an air gap 25 is formed by the annular space between an outer surface of the pressure vessel 23 and an inner surface of the shield wall 15. The air gap 25 provides for passive cooling in the column. The pressure vessel 23 is coupled to the shield base 17. Further, there is shown the column piping 16 that enters an upper or top end of the pressure vessel 23.

FIG. 4 is a schematic that shows a cut-away view of the pressure vessel 23 in one of the ion-exchange columns 11, including the shield wall 15, the column piping 16, the shield base 17, the shield cap 19 and the air gap 25 as shown in FIG. 3. FIG. 4 also shows a detailed view of the column piping 16 that includes: (i) a sluice header 16a which is connected to a sluice pipe 22, which is positioned within the pressure vessel 23 and vertically extends the length thereof, (ii) an outlet line/pipe 16b which extends into the pressure vessel 23 and along the vertical length thereof, (iii) an inlet line 16c which is positioned in a head space 26 of a sorbent bed 24, e.g., a CST bed, to allow entry of the filtered feed stream, and (iv) a vent 16d that is also positioned in the head space 26 of the sorbent bed 24. The head space 26 allows for bed expansion during sluicing and forms a space for the inlet line 16c, e.g., header distribution manifold, and also provides a space for the vent 16d. The sorbent bed 24 surrounds the sluice pipe 22 and the outlet line/pipe 16b within the pressure vessel 23. The sluice pipe 22 and the outlet line/pipe 16b may be empty or may include the presence of gas, e.g., air, nitrogen and mixtures thereof, or the presence of liquid, e.g., aqueous solution or water. The outlet line/pipe 16b and the vent 16d can each have an opening on the end that is positioned within the pressure vessel 23 in the sorbent bed 24 and the header space 26, respectively. In certain embodiments, there may be a mesh screen fitted over each of the openings.

Without intending to be bound by any particular theory, it is believed that the exterior surfaces of the sluice pipe 22 and the outlet line/pipe 16b are effective to provide heat transfer surface area in the pressure vessel 23.

The placing of the outlet line/pipe 16b and sluice line and pipe 16a,22 create an air flow path for unforced convection circulation cooling during storage or dry column layup during operations. The path for spent sorbent after the interim storage location can be either direct burial or vitrification and therefore, the column piping includes the sluice header that allows for removal (sluicing) of spent sorbent.

The ion-exchange columns 11 also can contain a HEPA filter (not shown) on the vent piping as additional mitigation of gas generation issues. The sluice header may also be fitted with a HEPA filter (not shown), and in combination with the vent piping, provides a means of internally cooling the ion-exchange column during storage, either interim or final.

FIG. 5 is a schematic that shows a top view of the pressure vessel 23 including the sluice pipe 22, the outlet line/pipe 16b and the sorbent bed 24, as shown in FIG. 4.

Prior to initiating the cesium removal process, preparation of the system can commence with column preparation. The CST is loaded into each of the columns. Each of the ion-exchange columns 11 includes a fill port (not shown) that allows the pressure vessel 23 of the column to be filled with CST. The resin fill port is located on top of the column, which receives a connection for a vacuum hose for filling the column. The column is filled by drawing a vacuum or a negative pressure on the column which, in turn, draws the CST into the column. Once the CST is loaded, the connection and vacuum hose are removed and the fill port is blind flanged prior to the shield cap being installed on top of the column. A reverse flow DI/well water flush of the ion-exchange columns is conducted to remove CST fines. Any fines that are removed can be shunted to a sanitary drain or to a designated tank. Following the water flush, the CST is flushed with sodium hydroxide to pre-condition the resin. The non-radioactive effluent from the conditioning step is disposed. Upon completion of the column conditioning steps, process flow from the storage tank is initiated.

After processing and use of the system, each of the ion-exchange columns is dewatered using dry air/nitrogen to minimize/eliminate gas generation, especially radiolytic hydrogen generation. In certain embodiment, the columns are washed with sodium hydroxide to remove aluminate and other base soluble components from the CST, then flushed with DI/well water. Following the post-wash, air pressure is used to remove contaminated water from the ion-exchange columns and associated piping prior to disconnecting the columns. The columns are dried with dry air/nitrogen to complete the drying process. Once moisture is removed from the columns, they are ready to be disconnected and removed from the enclosure. There may be an opening in the enclosure with a hatch, such that to remove the columns, the hatch in the top of the enclosure is unbolted and removed using a crane. Once the top hatch is removed, the ion-exchange columns are disconnected and removed therefrom.

The systems, apparatus and methods associated with tank cesium removal, in accordance with the invention, include one or more of the following features:
Effective for very high radioactive loading (25,000 curies);
"Cartridge" style with integral shielding, wherein all connections are external to the shielding;
Use of CST for high cesium-137 loading from high sodium waste matrix;
Two post-use options:
  Ground disposal; and
  Sluice of CST to a vitrification plant;
No active safety systems, as the loading and CST prevent issues, such as, heat loading and hydrogen generation;
An option of unforced convection circulation cooling during storage or dry column layup during operations; and
No storage tank, which minimizes the amount of high-level waste solution "at risk" above ground and also reduces radiation dose to personnel.

The apparatus in accordance with the invention is designed to provide the following features:
Bypass of loaded ion-exchange columns;
Valving in any column at any time;
Removal of columns(s) as single, self-contained unit(s);
Minimal personnel interaction;
Minimal dose (5 mR/hr @30 cm from columns);
Filtering and column flow with current, in-place storage tank pumps; and
Movement of the system to other points than the first deployment location.

Thus, in accordance with certain embodiments of the invention, there is provided a modular cesium removal system, which includes process equipment housed in a temporary and/or mobile enclosure and positioned on a modular equipment skid. This system provides operational simplicity by utilizing integrated, shielded ion-exchange columns that can be loaded and capable of removing 70,000 curies of cesium-137, then placed into an interim safe storage location as single units. This "cartridge" approach combined with the high cesium selectivity of CST resin provides for optimal resin utilization on multiple, e.g., four, shielded ion-exchange column assemblies. The process equipment can be housed, for example, in a modified sea-land container, which contains pre-filters and ion-exchange columns to reject insoluble particulates back to the original tank and remove ionic species, mainly cesium-137 from the effluent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

The invention claimed is:

1. An ion-exchange column assembly for removal of cesium from a stream of liquid waste, comprising:
  one or more integral, shielded ion-exchange columns, comprising:
    a shield base having a perimeter;
    a shield cap having a perimeter and positioned opposite the shield base;
    a shield wall extending longitudinally between the shield base and the shield cap, extending along the perimeter of each of the shield cap and the shield base, and forming an exterior surface;
    a shield cavity formed by the shield wall;
    a pressure vessel concentrically positioned within the shield cavity, comprising:
      a sorbent bed comprising an ion-exchange resin; and
      a head space positioned above the sorbent bed;
    an outlet pipe extending through the shield wall, through the head space, into the sorbent bed and along a vertical length thereof;
    an inlet pie extending through the shield wall and into the head space; and
    an air gap formed by an annular space between an outer surface of the pressure vessel and an inner surface of the shield wall.

2. The ion-exchange column assembly of claim 1, wherein the ion-exchange resin is crystalline silico-titanate.

3. The ion-exchange column assembly of claim 1, wherein at least one lug is coupled to the shield cap for use in lifting each of the one or more integral, shielded ion-exchange columns.

4. The ion-exchange column assembly of claim 1, wherein the pressure vessel contains a sluice pipe extending the vertical length thereof.

5. A cesium removal system, comprising:
a liquid waste stream that flows through a conduit;
one or more pre-filters to receive the liquid waste stream and discharge a filtered liquid waste stream;
an enclosure;
a skid located in the enclosure; and
one or more integral, shielded ion-exchange columns positioned on the skid and located downstream of the one or more pre-filters, to receive the filtered liquid waste stream, separate cesium therefrom, and to discharge a clean liquid stream, the one or more integral, shielded ion-exchange columns, comprising:
a shield base having a perimeter;
a shield cap having a perimeter and positioned opposite the shield base;
a shield wall extending longitudinally between the shield base and the shield cap, extending along the perimeter of each of the shield cap and the shield base, and forming an exterior surface;
a shield cavity formed by the shield wall;
a pressure vessel concentrically positioned within the shield cavity, comprising:
a sorbent bed comprising an ion-exchange resin; and
a head space positioned above the sorbent bed;
an outlet pipe extending through the shield wall, through the head space, into the sorbent bed and along a vertical length thereof;
an inlet pipe extending through the shield wall and into the head space; and
an air gap formed by a space between an outer surface of the pressure vessel and an inner surface of the shield wall.

6. The system of claim 5, wherein there are two pre-filters and four integral, shielded ion-exchange columns.

7. A method of removing cesium from a liquid waste stream, comprising:
transporting the liquid waste stream through conduit to one or more pre-filters to produce a filtered liquid waste stream;
introducing the filtered liquid waste stream into one or more integral, shielded ion-exchange columns, which comprise:
a shield base having a perimeter;
a shield cap having a perimeter and positioned opposite the shield base;
a shield wall extending longitudinally between the shield base and the shield cap, extending along the perimeter of each of the shield cap and the shield base, and forming an exterior surface;
a shield cavity formed by the shield wall;
a pressure vessel concentrically positioned within the shield cavity, comprising:
a sorbent bed comprising an ion-exchange resin; and
a head space positioned above the sorbent bed;
an outlet pine extending through the shield wall, through the head space, into the sorbent bed and along a vertical length thereof;
an inlet pipe extending through the shield wall and into the head space; and
an air gap formed by an annular space between an outer surface of the pressure vessel and an inner surface of the shield wall;
passing said filtered liquid waste stream through the one or more integral, shielded ion-exchange columns;
separating cesium from the filtered liquid waste stream to produce a clean liquid stream; and
transferring the one or more integral, shielded ion-exchange columns to a storage facility.

* * * * *